US009941747B2

(12) United States Patent
Bell et al.

(10) Patent No.: US 9,941,747 B2
(45) Date of Patent: Apr. 10, 2018

(54) SYSTEM AND METHOD FOR MANUALLY SELECTING AND DESELECTING DEVICES TO CHARGE IN A WIRELESS POWER NETWORK

(71) Applicant: ENERGOUS CORPORATION, Pleasanton, CA (US)

(72) Inventors: Douglas Bell, Pleasanton, CA (US); Michael Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 169 days.

(21) Appl. No.: 14/330,936

(22) Filed: Jul. 14, 2014

(65) Prior Publication Data

US 2016/0013678 A1 Jan. 14, 2016

(51) Int. Cl.

| | |
|---|---|
| ***G06F 1/00*** | (2006.01) |
| ***H02J 50/20*** | (2016.01) |
| ***H02J 7/02*** | (2016.01) |
| ***H02J 50/40*** | (2016.01) |
| ***H02J 50/80*** | (2016.01) |
| *H02J 7/00* | (2006.01) |

(52) U.S. Cl.

CPC .............. *H02J 50/20* (2016.02); *H02J 7/025* (2013.01); *H02J 50/40* (2016.02); *H02J 50/80* (2016.02); *H02J 2007/0001* (2013.01)

(58) Field of Classification Search

CPC .................................. H02J 7/025; H02J 50/80

See application file for complete search history.

(56) References Cited

U.S. PATENT DOCUMENTS

| | | | |
|---|---|---|---|
| 787,412 | A | 4/1905 | Tesla |
| 3,434,678 | A | 5/1965 | Brown et al. |
| 3,696,384 | A | 10/1972 | Lester |
| 3,754,269 | A | 8/1973 | Clavin |
| 4,101,895 | A | 7/1978 | Jones, Jr. |
| 4,360,741 | A | 11/1982 | Fitzsimmons et al. |
| 4,944,036 | A | 7/1990 | Hyatt |
| 4,995,010 | A | 2/1991 | Knight |

(Continued)

FOREIGN PATENT DOCUMENTS

| | | | |
|---|---|---|---|
| CN | 203826555 | U | 9/2014 |
| CN | 104090265 | A | 10/2014 |

(Continued)

OTHER PUBLICATIONS

International Search Report dated Jan. 27, 2015 corresponding to International Patent Application No. PCT/US2014/037170, 4 pages.

(Continued)

*Primary Examiner* — Austin Hicks

(74) *Attorney, Agent, or Firm* — Morgan, Lewis & Bockius LLP

(57) ABSTRACT

A system for selecting a deselecting charging devices in a wireless power network is disclosed here. The system includes a graphical user interface from which a user may select or deselect devices to be charged in a wireless power network. The disclosed system may store records from different components of a wireless power network into a database distributed throughout said network with copies stored within the memory of wireless power transmitters.

20 Claims, 7 Drawing Sheets

600

BEGIN

602 User Accesses Wireless Power Charging UI

604 Wireless Power Charging UI Queries Wireless Power Transmitter Database

606 User is Presented with Charging Options

608 User Selects and Holds Icon Device to Charge from Charge Off Area

610 User Drags Icon Device from Charge Off Area to Charging Area

612 Wireless Power Charging UI Updates Database and Sends Commands to a Wireless Power transmitter in Order to Charge the Device 614 Device Icon Displays in Charging Area

END

(56) References Cited

U.S. PATENT DOCUMENTS 5,200,759 A 4/1993 McGinnis
5,211,471 A 5/1993 Rohrs
5,548,292 A 8/1996 Hirshfield et al.
5,556,749 A 9/1996 Mitsuhashi et al.
5,646,633 A 7/1997 Dahlberg
5,697,063 A 12/1997 Kishigami et al.
5,712,642 A 1/1998 Hulderman
5,936,527 A 8/1999 Isaacman et al.
5,982,139 A 11/1999 Parise
6,046,708 A 4/2000 MacDonald, Jr. et al.
6,127,799 A 10/2000 Krishnan
6,127,942 A 10/2000 Welle
6,163,296 A 12/2000 Lier et al.
6,289,237 B1 9/2001 Mickle et al.
6,329,908 B1 12/2001 Frecska
6,421,235 B2 7/2002 Ditzik
6,437,685 B2 8/2002 Hanaki
6,456,253 B1 9/2002 Rummeli et al.
6,476,795 B1 11/2002 Derocher et al.
6,501,414 B2 12/2002 Amdt et al.
6,583,723 B2 6/2003 Watanabe et al.
6,597,897 B2 7/2003 Tang
6,615,074 B2 9/2003 Mickle et al.
6,664,920 B1 12/2003 Mott et al.
6,798,716 B1 9/2004 Charych
6,803,744 B1 10/2004 Sabo
6,856,291 B2 2/2005 Mickle et al.
6,911,945 B2 6/2005 Korva
6,960,968 B2 11/2005 Odendaal et al.
6,967,462 B1 11/2005 Landis
6,988,026 B2 1/2006 Breed et al.
7,003,350 B2 2/2006 Denker et al.
7,027,311 B2 4/2006 Vanderelli et al.
7,068,991 B2 6/2006 Parise
7,183,748 B1 2/2007 Unno et al.
7,191,013 B1 3/2007 Miranda et al.
7,196,663 B2 3/2007 Bolzer et al.
7,205,749 B2 4/2007 Hagen et al.
7,222,356 B1 * 5/2007 Yonezawa .............. H04N 7/181 348/14.02
7,274,334 B2 9/2007 o'Riordan et al.
7,274,336 B2 9/2007 Carson
7,351,975 B2 4/2008 Brady et al.
7,359,730 B2 4/2008 Dennis et al.
7,392,068 B2 6/2008 Dayan
7,403,803 B2 7/2008 Mickle et al.
7,451,839 B2 11/2008 Perlman
7,463,201 B2 12/2008 Chiang et al.
7,614,556 B2 11/2009 Overhultz et al.
7,639,994 B2 12/2009 Greene et al.
7,643,312 B2 1/2010 Vanderelli et al.
7,652,577 B1 1/2010 Madhow et al.
7,786,419 B2 8/2010 Hyde et al.
7,812,771 B2 10/2010 Greene et al.
7,830,312 B2 11/2010 Choudhury et al.
7,844,306 B2 11/2010 Shearer et al.
7,868,482 B2 1/2011 Greene et al.
7,898,105 B2 3/2011 Greene et al.
7,904,117 B2 3/2011 Doan et al.
7,925,308 B2 4/2011 Greene et al.
8,055,003 B2 11/2011 Mittleman et al.
8,070,595 B2 12/2011 Alderucci et al.
8,072,380 B2 12/2011 Crouch
8,092,301 B2 1/2012 Alderucci et al.
8,099,140 B2 1/2012 Arai
8,115,448 B2 2/2012 John
8,159,090 B2 4/2012 Greene et al.
8,159,364 B2 4/2012 Zeine
8,180,286 B2 5/2012 Yamasuge
8,228,194 B2 7/2012 Mickle
8,264,101 B2 9/2012 Hyde et al.
8,264,291 B2 9/2012 Morita
8,278,784 B2 10/2012 Cook et al.
8,284,101 B2 10/2012 Fusco
8,310,201 B1 11/2012 Wright
8,362,745 B2 1/2013 Tinaphong
8,380,255 B2 2/2013 Shearer et al.
8,410,953 B2 4/2013 Zeine
8,411,963 B2 4/2013 Luff
8,432,062 B2 4/2013 Greene et al.
8,432,071 B2 4/2013 Huang et al.
8,446,248 B2 5/2013 Zeine
8,447,234 B2 5/2013 Cook et al.
8,451,189 B1 5/2013 Fluhler
8,452,235 B2 5/2013 Kirby et al.
8,457,656 B2 6/2013 Perkins et al.
8,461,817 B2 6/2013 Martin et al.
8,467,733 B2 6/2013 Leabman
8,552,597 B2 10/2013 Song et al.
8,558,661 B2 10/2013 Zeine
8,560,026 B2 10/2013 Chanterac
8,604,746 B2 12/2013 Lee
8,614,643 B2 12/2013 Leabman
8,621,245 B2 12/2013 Shearer et al.
8,626,249 B2 1/2014 Kuusilinna et al.
8,629,576 B2 1/2014 Levine
8,653,966 B2 2/2014 Rao et al.
8,674,551 B2 3/2014 Low et al.
8,686,685 B2 4/2014 Moshfeghi
8,712,355 B2 4/2014 Black et al.
8,712,485 B2 4/2014 Tam
8,718,773 B2 5/2014 Wills et al.
8,729,737 B2 5/2014 Schatz et al.
8,736,228 B1 5/2014 Freed et al.
8,760,113 B2 6/2014 Keating
8,770,482 B2 7/2014 Ackermann et al.
8,772,960 B2 7/2014 Yoshida
8,823,319 B2 9/2014 Von Novak, III et al.
8,854,176 B2 10/2014 Zeine
8,860,364 B2 10/2014 Low et al.
8,897,770 B1 11/2014 Frolov et al.
8,923,189 B2 12/2014 Leabman
8,928,544 B2 1/2015 Massie et al.
8,937,408 B2 1/2015 Ganem et al.
8,946,940 B2 2/2015 Kim et al.
8,963,486 B2 2/2015 Kirby et al.
8,970,070 B2 3/2015 Sada et al.
8,989,053 B1 3/2015 Skaaksrud et al.
9,000,616 B2 4/2015 Greene et al.
9,001,622 B2 4/2015 Perry
9,006,934 B2 4/2015 Kozakai et al.
9,021,277 B2 4/2015 Shearer et al.
9,030,161 B2 5/2015 Lu et al.
9,059,598 B2 6/2015 Kang et al.
9,059,599 B2 6/2015 Won et al.
9,077,188 B2 7/2015 Moshfeghi
9,088,216 B2 7/2015 Garrity et al.
9,124,125 B2 9/2015 Leabman et al.
9,130,397 B2 9/2015 Leabman et al.
9,130,602 B2 9/2015 Cook
9,142,998 B2 9/2015 Yu et al.
9,143,000 B2 9/2015 Leabman et al.
9,143,010 B2 9/2015 Urano
9,178,389 B2 11/2015 Hwang
9,225,196 B2 12/2015 Huang et al.
9,242,411 B2 1/2016 Kritchman et al.
9,244,500 B2 1/2016 Cain et al.
9,252,628 B2 2/2016 Leabman et al.
9,270,344 B2 2/2016 Rosenberg
9,282,582 B1 3/2016 Dunsbergen et al.
9,294,840 B1 3/2016 Anderson et al.
9,297,896 B1 3/2016 Andrews
9,318,898 B2 4/2016 John
9,401,977 B1 7/2016 Gaw
9,450,449 B1 9/2016 Leabman et al.
9,461,502 B2 10/2016 Lee et al.
9,520,725 B2 12/2016 Masaoka et al.
9,520,748 B2 12/2016 Hyde et al.
9,522,270 B2 12/2016 Perryman et al.
9,537,354 B2 1/2017 Bell et al.
9,537,357 B2 1/2017 Leabman
9,537,358 B2 1/2017 Leabman
9,538,382 B2 1/2017 Bell et al.
9,544,640 B2 1/2017 Lau

(56) References Cited

U.S. PATENT DOCUMENTS 9,559,553 B2 1/2017 Bae
9,564,773 B2 2/2017 Pogorelik et al.
9,590,444 B2 3/2017 Walley
9,620,996 B2 4/2017 Zeine
2002/0001307 A1 1/2002 Nguyen et al.
2002/0028655 A1 3/2002 Rosener et al.
2002/0034958 A1 3/2002 Oberschmidt et al.
2002/0054330 A1 5/2002 Jinbo et al.
2002/0072784 A1 6/2002 Sheppard et al.
2002/0095980 A1 7/2002 Breed et al.
2002/0103447 A1 8/2002 Terry
2002/0133592 A1 9/2002 Matsuda
2002/0172223 A1 11/2002 Stilp
2003/0058187 A1 3/2003 Billiet et al.
2003/0076274 A1 4/2003 Phelan et al.
2003/0179152 A1 9/2003 Watada et al.
2003/0179573 A1 9/2003 Chun
2003/0192053 A1 10/2003 Sheppard et al.
2004/0019624 A1 1/2004 Sukegawa
2004/0020100 A1 2/2004 O'Brian et al.
2004/0036657 A1 2/2004 Forster et al.
2004/0107641 A1 6/2004 Walton et al.
2004/0113543 A1 6/2004 Daniels
2004/0119675 A1 6/2004 Washio et al.
2004/0130425 A1 7/2004 Dayan et al.
2004/0130442 A1 7/2004 Breed
2004/0142733 A1 7/2004 Parise
2004/0145342 A1 7/2004 Lyon
2004/0196190 A1 10/2004 Mendolia et al.
2004/0207559 A1 10/2004 Milosavljevic
2004/0218759 A1 11/2004 Yacobi
2004/0259604 A1 12/2004 Mickle et al.
2004/0263124 A1 12/2004 Wieck et al.
2005/0007276 A1 1/2005 Barrick et al.
2005/0030118 A1 2/2005 Wang
2005/0046584 A1 3/2005 Breed
2005/0055316 A1 3/2005 Williams
2005/0116683 A1 6/2005 Cheng
2005/0117660 A1 6/2005 Vialle et al.
2005/0171411 A1 8/2005 KenKnight
2005/0198673 A1 9/2005 Kit et al.
2005/0227619 A1 10/2005 Lee et al.
2005/0232469 A1 10/2005 Schofield
2005/0282591 A1 12/2005 Shaff
2006/0013335 A1 1/2006 Leabman
2006/0019712 A1 1/2006 Choi
2006/0030279 A1 2/2006 Leabman et al.
2006/0092079 A1 5/2006 de Rochemont
2006/0094425 A1 5/2006 Mickle et al.
2006/0113955 A1 6/2006 Nunally
2006/0119532 A1 6/2006 Yun et al.
2006/0160517 A1 7/2006 Yoon
2006/0183473 A1 8/2006 Ukon
2006/0190063 A1 8/2006 Kanzius
2006/0192913 A1 8/2006 Shutou et al.
2006/0199620 A1 9/2006 Greene et al.
2006/0238365 A1 10/2006 Vecchione et al.
2006/0266564 A1 11/2006 Perlman et al.
2006/0266917 A1 11/2006 Baldis et al.
2006/0278706 A1 12/2006 Hatakayama et al.
2006/0284593 A1 12/2006 Nagy et al.
2006/0287094 A1 12/2006 Mahaffey et al.
2007/0007821 A1 1/2007 Rossetti
2007/0019693 A1 1/2007 Graham
2007/0021140 A1 1/2007 Keyes
2007/0060185 A1 3/2007 Simon et al.
2007/0070490 A1 3/2007 Tsunoda et al.
2007/0093269 A1 4/2007 Leabman et al.
2007/0097653 A1 5/2007 Gilliland et al.
2007/0103110 A1 5/2007 Sagoo
2007/0106894 A1 5/2007 Zhang
2007/0109121 A1 5/2007 Cohen
2007/0139000 A1 6/2007 Kozuma
2007/0149162 A1 6/2007 Greene et al.
2007/0173196 A1 7/2007 Gallic
2007/0173214 A1 7/2007 Mickle et al.
2007/0178857 A1 8/2007 Greene et al.
2007/0178945 A1 8/2007 Cook et al.
2007/0182367 A1 8/2007 Partovi
2007/0191074 A1 8/2007 Harrist et al.
2007/0191075 A1 8/2007 Greene et al.
2007/0197281 A1 8/2007 Stronach
2007/0210960 A1 9/2007 Rofougaran et al.
2007/0222681 A1 9/2007 Greene et al.
2007/0273486 A1 11/2007 Shiotsu
2007/0298846 A1 12/2007 Greene et al.
2008/0062062 A1 3/2008 Borau et al.
2008/0062255 A1 3/2008 Gal
2008/0067874 A1 3/2008 Tseng
2008/0074324 A1 3/2008 Puzella et al.
2008/0089277 A1 4/2008 Aledander et al.
2008/0113816 A1 5/2008 Mahaffey et al.
2008/0122297 A1 5/2008 Arai
2008/0123383 A1 5/2008 Shionoiri
2008/0129536 A1 6/2008 Randall et al.
2008/0169910 A1 7/2008 Greene et al.
2008/0197802 A1 8/2008 Onishi
2008/0204342 A1 8/2008 Kharadly
2008/0204350 A1 8/2008 Tam et al.
2008/0210762 A1 9/2008 Osada et al.
2008/0211458 A1 9/2008 Lawther et al.
2008/0248758 A1 10/2008 Schedelbeck et al.
2008/0248846 A1 10/2008 Stronach et al.
2008/0278378 A1 11/2008 Chang et al.
2008/0309452 A1 12/2008 Zeine
2009/0002493 A1 1/2009 Kates
2009/0019183 A1 1/2009 Wu et al.
2009/0036065 A1 2/2009 Siu
2009/0047998 A1 2/2009 Alberth, Jr.
2009/0058354 A1 3/2009 Harrison
2009/0058361 A1 3/2009 John
2009/0067208 A1 3/2009 Martin et al.
2009/0096412 A1 4/2009 Huang
2009/0096413 A1 4/2009 Partovi
2009/0102292 A1 4/2009 Cook et al.
2009/0102296 A1 4/2009 Greene et al.
2009/0108679 A1 4/2009 Porwal
2009/0128262 A1 5/2009 Lee et al.
2009/0157911 A1 6/2009 Aihara
2009/0200985 A1 8/2009 Zane et al.
2009/0206791 A1 8/2009 Jung
2009/0207092 A1 8/2009 Nysen et al.
2009/0218884 A1 9/2009 Soar
2009/0218891 A1 9/2009 McCollough
2009/0219903 A1 9/2009 Alamouti et al.
2009/0243397 A1 10/2009 Cook et al.
2009/0264069 A1 10/2009 Yamasuge
2009/0280866 A1 11/2009 Lo et al.
2009/0281678 A1 11/2009 Wakamatsu
2009/0284082 A1 11/2009 Mohammadian
2009/0284083 A1 11/2009 Karalis et al.
2009/0284220 A1 11/2009 Toncich et al.
2009/0284227 A1 11/2009 Mohammadian et al.
2009/0284325 A1 11/2009 Rossiter et al.
2009/0286475 A1 11/2009 Toncich et al.
2009/0291634 A1* 11/2009 Saarisalo .......... H04M 1/72527 455/41.1
2009/0299175 A1 12/2009 Bernstein et al.
2009/0315412 A1 12/2009 Yamamoto et al.
2009/0322281 A1 12/2009 Kamijo et al.
2010/0001683 A1 1/2010 Huang et al.
2010/0007307 A1 1/2010 Baarman et al.
2010/0007569 A1 1/2010 Sim et al.
2010/0019686 A1 1/2010 Gutierrez, Jr.
2010/0026605 A1 2/2010 Yang et al.
2010/0027379 A1 2/2010 Saulnier et al.
2010/0029383 A1 2/2010 Dai
2010/0033021 A1 2/2010 Bennett
2010/0033390 A1 2/2010 Alamouti et al.
2010/0041453 A1 2/2010 Grimm, Jr.
2010/0044123 A1 2/2010 Perlman et al.
2010/0054200 A1 3/2010 Tsai
2010/0060534 A1 3/2010 Oodachi
2010/0075607 A1 3/2010 Hosoya

(56) References Cited

U.S. PATENT DOCUMENTS

2010/0079005 A1 4/2010 Hyde et al.
2010/0082193 A1 4/2010 Chiappetta
2010/0087227 A1 4/2010 Francos et al.
2010/0090656 A1 4/2010 Shearer et al.
2010/0109443 A1 5/2010 Cook et al.
2010/0119234 A1 5/2010 Suematsu et al.
2010/0123618 A1 5/2010 Martin et al.
2010/0123624 A1 5/2010 Minear et al.
2010/0127660 A1 5/2010 Cook et al.
2010/0142418 A1 6/2010 Nishioka et al.
2010/0142509 A1 6/2010 Zhu et al.
2010/0151808 A1 6/2010 Toncich et al.
2010/0156721 A1 6/2010 Alamouti et al.
2010/0164433 A1 7/2010 Janefalker et al.
2010/0171461 A1 7/2010 Baarman et al.
2010/0174629 A1 7/2010 Taylor et al.
2010/0176934 A1 7/2010 Chou et al.
2010/0181961 A1 7/2010 Novak et al.
2010/0181964 A1 7/2010 Huggins et al.
2010/0194206 A1 8/2010 Burdo et al.
2010/0201189 A1 8/2010 Kirby et al.
2010/0201201 A1 8/2010 Mobarhan et al.
2010/0201314 A1 8/2010 Toncich et al.
2010/0207572 A1 8/2010 Kirby et al.
2010/0214177 A1 8/2010 Parsche
2010/0225270 A1 9/2010 Jacobs et al.
2010/0227570 A1 9/2010 Hendin
2010/0237709 A1 9/2010 Hall et al.
2010/0244576 A1 9/2010 Hillan et al.
2010/0256831 A1 10/2010 Abramo et al.
2010/0259110 A1 10/2010 Kurs et al.
2010/0259447 A1 10/2010 Crouch
2010/0264747 A1 10/2010 Hall et al.
2010/0277003 A1 11/2010 Von Novak et al.
2010/0277121 A1 11/2010 Hall et al.
2010/0279606 A1 11/2010 Hillan et al.
2010/0289341 A1 11/2010 Ozaki et al.
2010/0295372 A1 11/2010 Hyde et al.
2010/0308767 A1 12/2010 Rofougaran et al.
2010/0309079 A1 12/2010 Rofougaran et al.
2010/0309088 A1 12/2010 Hyvonen et al.
2010/0315045 A1* 12/2010 Zeine ..................... H02J 7/025 320/137
2010/0316163 A1 12/2010 Forenza et al.
2010/0327766 A1 12/2010 Recker et al.
2010/0328044 A1 12/2010 Waffenschmidt et al.
2010/0332401 A1 12/2010 Prahlad et al.
2011/0018360 A1 1/2011 Baarman et al.
2011/0028114 A1 2/2011 Kerselaers
2011/0031928 A1 2/2011 Soar
2011/0032149 A1 2/2011 Leabman
2011/0032866 A1 2/2011 Leabman
2011/0034190 A1 2/2011 Leabman
2011/0034191 A1 2/2011 Leabman
2011/0043047 A1 2/2011 Karalis et al.
2011/0043163 A1 2/2011 Baarman
2011/0043327 A1 2/2011 Baarman et al.
2011/0050166 A1 3/2011 Cook et al.
2011/0055037 A1 3/2011 Hayashigawa et al.
2011/0056215 A1 3/2011 Ham
2011/0057607 A1 3/2011 Carobolante
2011/0074342 A1 3/2011 MacLaughlin
2011/0074349 A1 3/2011 Ghovanloo
2011/0074620 A1 3/2011 Wintermantel
2011/0078092 A1 3/2011 Kim et al.
2011/0090126 A1 4/2011 Szini et al.
2011/0114401 A1 5/2011 Kanno et al.
2011/0115303 A1 5/2011 Baarman et al.
2011/0115432 A1 5/2011 El-Maleh
2011/0115605 A1 5/2011 Dimig et al.
2011/0121660 A1 5/2011 Azancot et al.
2011/0122026 A1 5/2011 DeLaquil et al.
2011/0127845 A1 6/2011 Walley et al.
2011/0127952 A1 6/2011 Walley et al.
2011/0133655 A1 6/2011 Recker et al.
2011/0133691 A1 6/2011 Hautanen
2011/0148578 A1 6/2011 Aloi et al.
2011/0151789 A1 6/2011 Viglione et al.
2011/0154429 A1 6/2011 Stantchev
2011/0156494 A1 6/2011 Mashinsky
2011/0156640 A1 6/2011 Moshfeghi
2011/0163128 A1 7/2011 Taguchi et al.
2011/0175455 A1 7/2011 Hashiguchi
2011/0175461 A1 7/2011 Tinaphong
2011/0181120 A1 7/2011 Liu et al.
2011/0182245 A1 7/2011 Malkamaki et al.
2011/0184842 A1 7/2011 Melen
2011/0188207 A1 8/2011 Won et al.
2011/0194543 A1 8/2011 Zhao et al.
2011/0195722 A1 8/2011 Walter et al.
2011/0199046 A1 8/2011 Tsai et al.
2011/0215086 A1 9/2011 Yeh
2011/0217923 A1 9/2011 Ma
2011/0220634 A1 9/2011 Yeh
2011/0221389 A1 9/2011 Won et al.
2011/0222272 A1 9/2011 Yeh
2011/0243040 A1 10/2011 Khan et al.
2011/0243050 A1 10/2011 Yanover
2011/0244913 A1 10/2011 Kim et al.
2011/0248573 A1 10/2011 Kanno et al.
2011/0248575 A1 10/2011 Kim et al.
2011/0249678 A1 10/2011 Bonicatto
2011/0254377 A1 10/2011 Widmer et al.
2011/0254503 A1 10/2011 Widmer et al.
2011/0259953 A1 10/2011 Baarman et al.
2011/0273977 A1 11/2011 Shapira et al.
2011/0278941 A1 11/2011 Krishna et al.
2011/0279226 A1 11/2011 Chen et al.
2011/0281535 A1 11/2011 Low et al.
2011/0282415 A1 11/2011 Eckhoff et al.
2011/0285213 A1 11/2011 Kowalewski
2011/0286374 A1 11/2011 Shin et al.
2011/0291489 A1 12/2011 Tsai et al.
2011/0302078 A1 12/2011 Failing
2011/0304216 A1 12/2011 Baarman
2011/0304437 A1 12/2011 Beeler
2012/0013196 A1 1/2012 Kim et al.
2012/0013198 A1 1/2012 Uramoto et al.
2012/0013296 A1 1/2012 Heydari et al.
2012/0019419 A1 1/2012 Prat et al.
2012/0043887 A1 2/2012 Mesibov
2012/0051109 A1 3/2012 Kim et al.
2012/0051294 A1 3/2012 Guillouard
2012/0056486 A1 3/2012 Endo et al.
2012/0056741 A1 3/2012 Zhu et al.
2012/0074891 A1 3/2012 Anderson et al.
2012/0231856 A1 3/2012 Lee et al.
2012/0080957 A1 4/2012 Cooper et al.
2012/0086284 A1 4/2012 Capanella et al.
2012/0098350 A1 4/2012 Campanella et al.
2012/0098485 A1 4/2012 Kang et al.
2012/0099675 A1 4/2012 Kitamura et al.
2012/0103562 A1 5/2012 Clayton
2012/0104849 A1 5/2012 Jackson
2012/0105252 A1 5/2012 Wang
2012/0112532 A1 5/2012 Kesler et al.
2012/0119914 A1 5/2012 Uchida
2012/0126743 A1 5/2012 Rivers, Jr.
2012/0132647 A1 5/2012 Beverly et al.
2012/0133214 A1 5/2012 Yun et al.
2012/0146426 A1 6/2012 Sabo
2012/0146576 A1 6/2012 Partovi
2012/0146577 A1 6/2012 Tanabe
2012/0147802 A1 6/2012 Ukita et al.
2012/0150670 A1 6/2012 Taylor et al.
2012/0153894 A1 6/2012 Widmer et al.
2012/0157019 A1 6/2012 Li
2012/0161531 A1 6/2012 Kim et al.
2012/0161544 A1 6/2012 Kashiwagi et al.
2012/0169276 A1 7/2012 Wang
2012/0169278 A1 7/2012 Choi
2012/0173418 A1 7/2012 Beardsmore et al.
2012/0181973 A1 7/2012 Lyden
2012/0182427 A1 7/2012 Marshall

(56) References Cited

U.S. PATENT DOCUMENTS

2012/0187851 A1 8/2012 Huggins et al.
2012/0193999 A1 8/2012 Zeine
2012/0200399 A1 8/2012 Chae
2012/0201153 A1 8/2012 Bharadia et al.
2012/0201173 A1 8/2012 Jian et al.
2012/0206299 A1 8/2012 Valdes-Garcia
2012/0212072 A1 8/2012 Miyabayashi et al.
2012/0214536 A1 8/2012 Kim et al.
2012/0228956 A1 9/2012 Kamata
2012/0235636 A1 9/2012 Partovi
2012/0242283 A1 9/2012 Kim et al.
2012/0248886 A1 10/2012 Kesler et al.
2012/0248891 A1 10/2012 Drennen
2012/0249051 A1 10/2012 Son et al.
2012/0262002 A1 10/2012 Widmer et al.
2012/0267900 A1 10/2012 Huffman et al.
2012/0268238 A1 10/2012 Park et al.
2012/0274154 A1 11/2012 DeLuca
2012/0280650 A1 11/2012 Kim et al.
2012/0292993 A1 11/2012 Mettler et al.
2012/0293021 A1 11/2012 Teggatz et al.
2012/0293119 A1 11/2012 Park et al.
2012/0299389 A1 11/2012 Lee et al.
2012/0299540 A1 11/2012 Perry
2012/0299541 A1 11/2012 Perry
2012/0299542 A1 11/2012 Perry
2012/0300588 A1 11/2012 Perry
2012/0300592 A1 11/2012 Perry
2012/0300593 A1 11/2012 Perry
2012/0306705 A1 12/2012 Sakurai et al.
2012/0309295 A1 12/2012 Maguire
2012/0309308 A1 12/2012 Kim et al.
2012/0309332 A1 12/2012 Liao
2012/0313449 A1 12/2012 Kurs
2012/0326660 A1 12/2012 Lu et al.
2013/0002550 A1 1/2013 Zalewski
2013/0024059 A1 1/2013 Miller et al.
2013/0026981 A1 1/2013 Van Der Lee
2013/0026982 A1 1/2013 Rothenbaum
2013/0032589 A1 2/2013 Chung
2013/0033571 A1 2/2013 Steen
2013/0038124 A1 2/2013 Newdoll et al.
2013/0038402 A1 2/2013 Karalis et al.
2013/0043738 A1 2/2013 Park et al.
2013/0049471 A1 2/2013 Oleynik
2013/0049475 A1 2/2013 Kim et al.
2013/0057078 A1 3/2013 Lee
2013/0057205 A1 3/2013 Lee et al.
2013/0057210 A1 3/2013 Negaard et al.
2013/0057364 A1 3/2013 Kesler et al.
2013/0063082 A1 3/2013 Lee et al.
2013/0063143 A1 3/2013 Adalsteinsson et al.
2013/0069444 A1 3/2013 Waffenschmidt et al.
2013/0077650 A1 3/2013 Traxler et al.
2013/0078918 A1 3/2013 Crowley et al.
2013/0082651 A1 4/2013 Park et al.
2013/0082653 A1 4/2013 Lee et al.
2013/0083774 A1 4/2013 Son et al.
2013/0088082 A1 4/2013 Kang et al.
2013/0088090 A1 4/2013 Wu
2013/0088192 A1 4/2013 Eaton
2013/0088331 A1 4/2013 Cho
2013/0093388 A1 4/2013 Partovi
2013/0099389 A1 4/2013 Hong et al.
2013/0099586 A1 4/2013 Kato
2013/0106197 A1 5/2013 Bae et al.
2013/0107023 A1 5/2013 Tanaka et al.
2013/0119777 A1 5/2013 Rees
2013/0119929 A1 5/2013 Partovi
2013/0120217 A1 5/2013 Ueda et al.
2013/0132010 A1 5/2013 Winger et al.
2013/0134923 A1 5/2013 Smith
2013/0137455 A1 5/2013 Xia
2013/0141037 A1 6/2013 Jenwatanavet et al.
2013/0148341 A1 6/2013 Williams
2013/0149975 A1 6/2013 Yu et al.
2013/0154387 A1 6/2013 Lee et al.
2013/0155748 A1 6/2013 Sundstrom
2013/0157729 A1 6/2013 Tabe
2013/0169061 A1 7/2013 Microshnichenko et al.
2013/0169219 A1 7/2013 Gray
2013/0169348 A1 7/2013 Shi
2013/0171939 A1 7/2013 Tian et al.
2013/0178253 A1 7/2013 Karaoguz
2013/0181881 A1 7/2013 Christie et al.
2013/0193769 A1 8/2013 Mehta et al.
2013/0197320 A1 8/2013 Albert et al.
2013/0200064 A1 8/2013 Alexander
2013/0207477 A1 8/2013 Nam et al.
2013/0207604 A1 8/2013 Zeine
2013/0210357 A1 8/2013 Qin et al.
2013/0221757 A1 8/2013 Cho et al.
2013/0234530 A1 9/2013 Miyauchi
2013/0234536 A1 9/2013 Chemishkian et al.
2013/0234658 A1 9/2013 Endo et al.
2013/0241306 A1 9/2013 Aber et al.
2013/0241468 A1 9/2013 Moshfeghi
2013/0241474 A1 9/2013 Moshfeghi
2013/0249478 A1 9/2013 Hirano
2013/0249479 A1 9/2013 Partovi
2013/0254578 A1 9/2013 Huang
2013/0264997 A1 10/2013 Lee et al.
2013/0268782 A1 10/2013 Tam et al.
2013/0270923 A1 10/2013 Cook et al.
2013/0278209 A1 10/2013 Von Novak
2013/0285477 A1 10/2013 Lo et al.
2013/0285606 A1 10/2013 Ben-Shalom et al.
2013/0288600 A1 10/2013 Kuusilinna et al.
2013/0293423 A1 11/2013 Moshfeghi
2013/0310020 A1* 11/2013 Kazuhiro ............ H04W 52/367 455/422.1
2013/0311798 A1 11/2013 Sultenfuss
2013/0328417 A1 12/2013 Takeuchi
2013/0339108 A1 12/2013 Ryder et al.
2013/0343251 A1 12/2013 Zhang
2014/0001846 A1 1/2014 Mosebrook
2014/0001875 A1 1/2014 Nahidipour
2014/0001876 A1 1/2014 Fujiwara et al.
2014/0006017 A1 1/2014 Sen
2014/0008992 A1 1/2014 Leabman
2014/0008993 A1 1/2014 Leabman
2014/0009108 A1 1/2014 Leabman
2014/0011531 A1 1/2014 Burstrom et al.
2014/0015336 A1 1/2014 Weber et al.
2014/0015344 A1 1/2014 Mohamadi
2014/0021907 A1 1/2014 Yu et al.
2014/0021908 A1 1/2014 McCool
2014/0035524 A1 2/2014 Zeine
2014/0035526 A1 2/2014 Tripathi et al.
2014/0049422 A1 2/2014 Von Novak et al.
2014/0055098 A1* 2/2014 Lee ........................ H02J 7/025 320/137
2014/0057618 A1 2/2014 Zirwas et al.
2014/0062395 A1 3/2014 Kwon et al.
2014/0086125 A1 3/2014 Polo et al.
2014/0091756 A1 4/2014 Ofstein et al.
2014/0091968 A1 4/2014 Hard et al.
2014/0111147 A1 4/2014 Soar
2014/0113689 A1 4/2014 Lee
2014/0117946 A1 5/2014 Muller et al.
2014/0118140 A1 5/2014 Amis
2014/0133279 A1 5/2014 Khuri-Yakub
2014/0139034 A1 5/2014 Sankar et al.
2014/0139039 A1 5/2014 Cook et al.
2014/0139180 A1 5/2014 Kim et al.
2014/0141838 A1 5/2014 Cai et al.
2014/0142876 A1 5/2014 John et al.
2014/0143933 A1 5/2014 Low et al.
2014/0145879 A1 5/2014 Pan
2014/0152117 A1 6/2014 Sanker
2014/0159652 A1 6/2014 Hall et al.
2014/0159662 A1 6/2014 Furui
2014/0159667 A1 6/2014 Kim et al.
2014/0175893 A1 6/2014 Sengupta et al.

(56) References Cited

U.S. PATENT DOCUMENTS

2014/0176054 A1 6/2014 Porat et al.
2014/0177399 A1 6/2014 Teng et al.
2014/0184148 A1 7/2014 Van Der Lee et al.
2014/0184155 A1 7/2014 Cha
2014/0184163 A1 7/2014 Das et al.
2014/0184170 A1* 7/2014 Jeong .................... B60L 11/184 320/137
2014/0191568 A1 7/2014 Partovi
2014/0194092 A1 7/2014 Wanstedt et al.
2014/0194095 A1 7/2014 Wanstedt et al.
2014/0206384 A1 7/2014 Kim et al.
2014/0210281 A1 7/2014 Ito et al.
2014/0217967 A1 8/2014 Zeine et al.
2014/0225805 A1 8/2014 Pan et al.
2014/0232320 A1 8/2014 Ento July et al.
2014/0239733 A1 8/2014 Mach et al.
2014/0241231 A1 8/2014 Zeine
2014/0245036 A1 8/2014 Oishi
2014/0246416 A1 9/2014 White
2014/0247152 A1 9/2014 Proud
2014/0252813 A1 9/2014 Lee et al.
2014/0252866 A1 9/2014 Walsh et al.
2014/0265725 A1 9/2014 Angle et al.
2014/0265727 A1 9/2014 Berte
2014/0265943 A1 9/2014 Angle et al.
2014/0266025 A1 9/2014 Jakubowski
2014/0273892 A1 9/2014 Nourbakhsh
2014/0281655 A1 9/2014 Angle et al.
2014/0292090 A1 10/2014 Cordeiro et al.
2014/0312706 A1 10/2014 Fiorello et al.
2014/0325218 A1 10/2014 Shimizu et al.
2014/0327320 A1 11/2014 Muhs et al.
2014/0327390 A1 11/2014 Park et al.
2014/0346860 A1 11/2014 Aubry et al.
2014/0354063 A1 12/2014 Leabman et al.
2014/0354221 A1 12/2014 Leabman et al.
2014/0355718 A1 12/2014 Guan et al.
2014/0357309 A1 12/2014 Leabman et al.
2014/0368048 A1 12/2014 Leabman
2014/0368161 A1 12/2014 Leabman et al.
2014/0375253 A1 12/2014 Leabman et al.
2014/0375255 A1 12/2014 Leabman et al.
2014/0375258 A1 12/2014 Arkhipenkov
2014/0375261 A1 12/2014 Manova-Elssibony et al.
2014/0376646 A1 12/2014 Leabman et al.
2015/0001949 A1 1/2015 Leabman et al.
2015/0002086 A1 1/2015 Matos et al.
2015/0003207 A1 1/2015 Lee et al.
2015/0008980 A1 1/2015 Kim et al.
2015/0011160 A1 1/2015 Uurgovan et al.
2015/0015180 A1 1/2015 Miller et al.
2015/0015192 A1 1/2015 Leabman et al.
2015/0015194 A1 1/2015 Leabman et al.
2015/0015195 A1 1/2015 Leabman et al.
2015/0021990 A1 1/2015 Myer et al.
2015/0022008 A1 1/2015 Leabman et al.
2015/0022009 A1 1/2015 Leabman et al.
2015/0022010 A1 1/2015 Leabman et al.
2015/0028688 A1 1/2015 Masaoka
2015/0028694 A1 1/2015 Leabman et al.
2015/0028697 A1 1/2015 Leabman et al.
2015/0029397 A1 1/2015 Leabman et al.
2015/0035715 A1 2/2015 Kim et al.
2015/0041459 A1 2/2015 Leabman et al.
2015/0042264 A1 2/2015 Leabman et al.
2015/0042265 A1 2/2015 Leabman et al.
2015/0044977 A1 2/2015 Ramasamy et al.
2015/0046526 A1 2/2015 Bush et al.
2015/0061404 A1 3/2015 Lamenza et al.
2015/0076917 A1 3/2015 Leabman et al.
2015/0076927 A1 3/2015 Leabman et al.
2015/0077036 A1 3/2015 Leabman et al.
2015/0077037 A1 3/2015 Leabman et al.
2015/0091520 A1 4/2015 Blum et al.
2015/0097663 A1 4/2015 Sloo et al.
2015/0102681 A1 4/2015 Leabman et al.
2015/0102764 A1 4/2015 Leabman et al.
2015/0102769 A1 4/2015 Leabman et al.
2015/0108848 A1 4/2015 Joehren
2015/0115877 A1 4/2015 Aria et al.
2015/0115878 A1 4/2015 Park
2015/0123483 A1 5/2015 Leabman et al.
2015/0123496 A1 5/2015 Leabman et al.
2015/0128733 A1 5/2015 Taylor et al.
2015/0130285 A1 5/2015 Leabman et al.
2015/0148664 A1 5/2015 Stolka et al.
2015/0155737 A1 6/2015 Mayo
2015/0155738 A1 6/2015 Leabman et al.
2015/0162751 A1 6/2015 Leabman et al.
2015/0162779 A1 6/2015 Lee et al.
2015/0171656 A1 6/2015 Leabman et al.
2015/0171658 A1 6/2015 Manova-Elssibony et al.
2015/0171931 A1 6/2015 Won et al.
2015/0177326 A1 6/2015 Chakraborty et al.
2015/0188352 A1 7/2015 Peek et al.
2015/0199665 A1 7/2015 Chu
2015/0222126 A1 8/2015 Leabman et al.
2015/0236520 A1 8/2015 Baarman
2015/0244187 A1 8/2015 Horie
2015/0244201 A1 8/2015 Chu
2015/0244341 A1 8/2015 Ritter et al.
2015/0249484 A1 9/2015 Mach et al.
2015/0255989 A1 9/2015 Walley et al.
2015/0263534 A1 9/2015 Lee et al.
2015/0263548 A1 9/2015 Cooper
2015/0270741 A1 9/2015 Leabman et al.
2015/0280484 A1 10/2015 Radziemski et al.
2015/0288438 A1 10/2015 Maltsev et al.
2015/0318729 A1 11/2015 Leabman
2015/0326024 A1 11/2015 Bell et al.
2015/0326025 A1 11/2015 Bell et al.
2015/0326063 A1 11/2015 Leabman et al.
2015/0326068 A1 11/2015 Bell et al.
2015/0326069 A1 11/2015 Petras et al.
2015/0326070 A1 11/2015 Petras et al.
2015/0326072 A1 11/2015 Petras et al.
2015/0326142 A1 11/2015 Petras et al.
2015/0333528 A1 11/2015 Leabman
2015/0333529 A1 11/2015 Leabman
2015/0333573 A1 11/2015 Leabman
2015/0333800 A1 11/2015 Perry et al.
2015/0340759 A1 11/2015 Bridgelall et al.
2015/0340903 A1 11/2015 Bell et al.
2015/0340909 A1 11/2015 Bell et al.
2015/0340910 A1 11/2015 Petras et al.
2015/0340911 A1 11/2015 Bell et al.
2015/0341087 A1 11/2015 Moore et al.
2015/0349574 A1 12/2015 Leabman
2015/0358222 A1 12/2015 Berger et al.
2015/0365138 A1 12/2015 Miller et al.
2016/0005068 A1 1/2016 Im et al.
2016/0012695 A1 1/2016 Bell et al.
2016/0013656 A1 1/2016 Bell et al.
2016/0013677 A1 1/2016 Bell et al.
2016/0013678 A1 1/2016 Bell et al.
2016/0013855 A1 1/2016 Campos
2016/0020636 A1 1/2016 Khlat
2016/0020649 A1 1/2016 Bell et al.
2016/0020830 A1 1/2016 Bell et al.
2016/0042206 A1 2/2016 Pesavento et al.
2016/0054396 A1 2/2016 Bell et al.
2016/0054440 A1 2/2016 Younis
2016/0056635 A1 2/2016 Bell
2016/0056640 A1 2/2016 Mao
2016/0056669 A1 2/2016 Bell
2016/0056966 A1 2/2016 Bell
2016/0065005 A1 3/2016 Won et al.
2016/0079799 A1 3/2016 Khlat
2016/0099601 A1 4/2016 Leabman et al.
2016/0099602 A1 4/2016 Leabman et al.
2016/0099609 A1 4/2016 Leabman et al.
2016/0099610 A1 4/2016 Leabman et al.
2016/0099611 A1 4/2016 Leabman et al.
2016/0099612 A1 4/2016 Leabman et al.

(56) References Cited

U.S. PATENT DOCUMENTS

| | | | |
|---|---|---|---|
| 2016/0099613 | A1 | 4/2016 | Leabman et al. |
| 2016/0099614 | A1 | 4/2016 | Leabman et al. |
| 2016/0099755 | A1 | 4/2016 | Leabman et al. |
| 2016/0099756 | A1 | 4/2016 | Leabman et al. |
| 2016/0099757 | A1 | 4/2016 | Leabman et al. |
| 2016/0099758 | A1 | 4/2016 | Leabman et al. |
| 2016/0100124 | A1 | 4/2016 | Leabman et al. |
| 2016/0100312 | A1 | 4/2016 | Bell et al. |
| 2016/0126752 | A1 | 5/2016 | Vuori et al. |
| 2016/0126776 | A1 | 5/2016 | Kim et al. |
| 2016/0141908 | A1 | 5/2016 | Jakl et al. |
| 2016/0164563 | A1 | 6/2016 | Khawand et al. |
| 2016/0181867 | A1 | 6/2016 | Daniel et al. |
| 2016/0181873 | A1 | 6/2016 | Mitcheson et al. |
| 2016/0191121 | A1 | 6/2016 | Bell |
| 2016/0204622 | A1 | 7/2016 | Leabman |
| 2016/0204642 | A1 | 7/2016 | Oh |
| 2016/0238365 | A1 | 8/2016 | Wixey et al. |
| 2016/0323000 | A1 | 11/2016 | Liu et al. |
| 2016/0336804 | A1 | 11/2016 | Son et al. |
| 2016/0339258 | A1 | 11/2016 | Perryman et al. |
| 2016/0359367 | A1 | 12/2016 | Rothschild |
| 2017/0005516 | A9 | 1/2017 | Leabman et al. |
| 2017/0025903 | A1 | 1/2017 | Song et al. |
| 2017/0026087 | A1 | 1/2017 | Tanabe |
| 2017/0043675 | A1 | 2/2017 | Jones et al. |
| 2017/0047784 | A1 | 2/2017 | Jung et al. |
| 2017/0085120 | A1 | 3/2017 | Leabman et al. |
| 2017/0085437 | A1 | 3/2017 | Condeixa et al. |
| 2017/0092115 | A1 | 3/2017 | Sloo et al. |

FOREIGN PATENT DOCUMENTS

| | | | |
|---|---|---|---|
| EP | 1028482 | A2 | 8/2000 |
| EP | 1081506 | A1 | 3/2001 |
| EP | 2397973 | A1 | 6/2010 |
| EP | 2346136 | A1 | 7/2011 |
| EP | 2545635 | A2 | 1/2013 |
| JP | 2006157586 | A | 6/2006 |
| JP | 2007043432 | A | 2/2007 |
| JP | 2008167017 | A | 7/2008 |
| KR | 20060061776 | A | 6/2006 |
| KR | 20070044302 | A | 4/2007 |
| KR | 100755144 | B1 | 9/2007 |
| KR | 20110132059 | A | 12/2011 |
| KR | 20110135540 | A1 | 12/2011 |
| KR | 20120009843 | A | 2/2012 |
| KR | 20120108759 | A | 10/2012 |
| KR | 1020130026977 | A | 3/2013 |
| WO | 9952173 | A2 | 10/1999 |
| WO | WO 200111716 | A1 | 2/2001 |
| WO | 2004077550 | A1 | 9/2004 |
| WO | 2003091943 | A1 | 11/2006 |
| WO | WO 2006122783 | | 11/2006 |
| WO | 2008156571 | A2 | 12/2008 |
| WO | 2010022181 | A1 | 2/2010 |
| WO | WO 2010039246 | A1 | 4/2010 |
| WO | WO 2010138994 | A1 | 12/2010 |
| WO | 2011112022 | A2 | 9/2011 |
| WO | 2013035190 | A1 | 3/2013 |
| WO | WO 2013031988 | A1 | 3/2013 |
| WO | WO 2013042399 | A1 | 3/2013 |
| WO | WO 2013052950 | A1 | 4/2013 |
| WO | WO 2013105920 | A2 | 7/2013 |
| WO | WO 2014075103 | A1 | 5/2014 |
| WO | WO 2014132258 | A1 | 9/2014 |
| WO | WO 2014182788 | A2 | 11/2014 |
| WO | WO 2014182788 | A3 | 11/2014 |
| WO | WO 2014197472 | A1 | 12/2014 |
| WO | WO 2014209587 | A1 | 12/2014 |
| WO | WO 2015038773 | A1 | 3/2015 |
| WO | WO 2015097809 | A1 | 7/2015 |
| WO | WO 2015161323 | A1 | 10/2015 |
| WO | WO 2016048512 | A1 | 3/2016 |
| WO | WO 2016187357 | A1 | 11/2016 |

OTHER PUBLICATIONS

International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Sep. 12, 2014 corresponding to International Patent Application No. PCT/US2014/037072, 3 pages.
Energous Corp., Written Opinion, PCT/US2014/037170 , dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., IPRP, PCT/US2014/046956, dated Jan. 19, 2016, 7 pgs.
Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.
Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.

(56) References Cited

OTHER PUBLICATIONS

Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015, 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP , PCT/US2014/045237, dated Jan. 12, 2016, 12 pgs.
Energous Corp., ISRWO , PCT/US2014/054897, dated Feb. 17, 2015, 10 pgs.
Energous Corp., IPRP , PCT/US2014/054897, dated Mar. 15, 2016, 8 pgs.
Energous Corp., ISRWO , PCT/US2015/067334, dated Mar. 3, 2016, 6 pgs.
Energous Corp., IPRP , PCT/US2015/067334, dated Jul. 4, 2017, 5 pgs.
Energous Corp., ISRWO , PCT/US2014/047963, dated Nov. 7, 2014, 13 pgs.
Energous Corp., IPRP , PCT/US2014/047963, dated Jan. 26, 2016, 10 pgs.
Energous Corp., ISRWO , PCT/US2014/054891, dated Dec. 18, 2014, 12 pgs.
Energous Corp., IPRP , PCT/US2014/054891, dated Mar. 15, 2016, 10 pgs.
Energous Corp., ISRWO , PCT/US2014/054953, dated Dec. 4, 2014, 7 pgs.
Energous Corp., IPRP , PCT/US2014/054953, dated Mar. 22, 2016, 5 pgs.
Energous Corp., ISRWO , PCT/US2015/067294, dated Mar. 29, 2016, 7 pgs.
Energous Corp., IPRP , PCT/US2015/067294, dated Jul. 4, 2017, 6 pgs.
Energous Corp., ISRWO , PCT/US2014/062672 dated Jan. 26, 2015, 11 pgs.
Energous Corp., IPRP , PCT/US2014/062672 dated May 10, 2016, 8 pgs.
Energous Corp., ISRWO , PCT/US2014/044810 dated Oct. 21, 2014, 12 pgs.
Energous Corp., IPRP , PCT/US2014/044810, dated Jan. 5, 2016, 10 pgs.
Energous Corp., ISRWO , PCT/US2015/067271, dated Mar. 11, 2016, 6 pgs.
Energous Corp., IPRP , PCT/US2015/067271, dated Jul. 4, 2017, 5 pgs.
Energous Corp., ISRWO , PCT/US2014/040648, dated Oct. 10, 2014, 11 pgs.
Energous Corp., IPRP , PCT/US2014/040648, dated Dec. 8, 2015, 8 pgs.
Energous Corp., ISRWO , PCT/US2014/049673, dated Nov. 18, 2014, 10 pgs.
Energous Corp., IPRP , PCT/US2014/049673, dated Feb. 9, 2016, 6 pgs.
Energous Corp., ISRWO , PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.

(56) References Cited

OTHER PUBLICATIONS

Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316 , dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

* cited by examiner

SYSTEM AND METHOD FOR MANUALLY SELECTING AND DESELECTING DEVICES TO CHARGE IN A WIRELESS POWER NETWORK

CROSS-REFERENCE TO RELATED APPLICATIONS

The present disclosure is related to U.S. patent application Ser. No. 13/891,399 entitled Receivers For Wireless Power Transmission, filed May 10, 2013, U.S. patent application Ser. No. 13/891,430 entitled Methodology For Pocket-Forming, filed May 10, 2013, and U.S. patent application Ser. No. 13/891,445 entitled Transmitters For Wireless Power Transmission, filed May 10, 2013, each of which are incorporated by reference in their entirety herein.

N/A

BACKGROUND

Field of the Disclosure

The present disclosure relates in general to wireless power transmission, and more specifically to a system software for enabling a user to select and deselect devices to charge in a wireless power transmission network.

Background Information

Electronic devices such as laptop computers, smartphones, portable gaming devices, tablets and so forth may require power for performing their intended functions. This may require having to charge electronic equipment at least once a day, or in high-demand electronic devices more than once a day. Such an activity may be tedious and may represent a burden to users. For example, a user may be required to carry chargers in case his electronic equipment is lacking power. In addition, users have to find available power sources to connect to. Lastly, users must plugin to a wall power socket or other power supply to be able to charge his or her electronic device.

An approach to mitigate this issue may include using RF waves through suitable power transmission techniques such as pocket-forming. This approach may provide wireless power transmission while eliminating the use of wires or pads for charging devices. In addition, electronic equipment may require less components as typical wall chargers may not be required.

In some cases, even batteries may be eliminated as a device may fully be powered wirelessly. This approach may enable the creation of wireless power networks similar in structure to regular wireless local area networks (WLAN) where a wireless access point is used to provide internet or intranet access to different devices. An access point or wireless transmitter may provide wireless power charging to different receiver devices.

Electric energy is an important and expensive resource. At times improper handling of electric energy may lead to waste of the valuable resource, in other cases too much electrical current may damage certain devices. It may also be beneficial in some cases to allow power sources to prioritize certain devices over others. Thus, a need exists for selecting and deselecting devices to charge in a wireless power network.

SUMMARY

Disclosed is a system and method for managing a wireless power network. The wireless power network may include wireless power transmitters with an embedded wireless power management application. This power transmitter manager application may include a device database where information about receiver devices may be stored.

The wireless power network may include a plurality of client devices with wireless power receivers built in as part of the device or adapted externally. Wireless power receivers may include a power receiver application configured to communicate with the power transmitter manager application in a wireless power transmitter. Communication between wireless power transmitters and wireless power receivers may be achieved using standard network communication protocols such as, Bluetooth, Bluetooth Low Energy, WIFI or the like.

The wireless power network may further include a wireless power application. The wireless power manager may be a software application, which may be hosted in a computing device, which may be either a local or cloud-based physical or virtual server, or a mobile or hand-held or wearable computing device such as a smart phone, tablet, notebook, laptop or the like. The wireless power manager application may communicate with a power transmitter manager application to update information in the wireless power manager's database at the transmitter, such as: statuses, power schedules, setting priorities, authentication credentials, present charge and tracking states, and the like. Wireless power manager may include a GUI which may be used by a user to perform management tasks in the wireless power transmission network. The GUI may be a local application interface on the computer running the wireless power management application software, or the GUI may be one or more web pages hosted by said computer.

The wireless power manager may include a software GUI for automatically or manually selecting and deselecting one or more devices to be charged in the wireless power network. The software GUI may include a charge off area, displaying icons of all devices that are currently not being charged in the wireless power network. The software module may additionally include a charging area displaying devices in the wireless power network that are receiving charge. The software GUI may additionally include an automatic charge area displaying icons of devices that have charging enabled or disabled automatically. A user may select a device icon from either the charge off area or automatic charge area and drag it to the charging area in order to enable the device to receive charge in the wireless power network. A user may also select icon devices from the either the charging area or the automatic charge area and drag them to the charge off area in order to disable the device from receiving charge. A user may also drag a device icon from either charge-off area or charging area to the automatic-charge area of the view screen, to command the wireless power transmitter to automatically make the decision to enable or disable charging the device based on status criteria, such as, but not limited to, time, physical location or hot spot, by user name, or the like.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
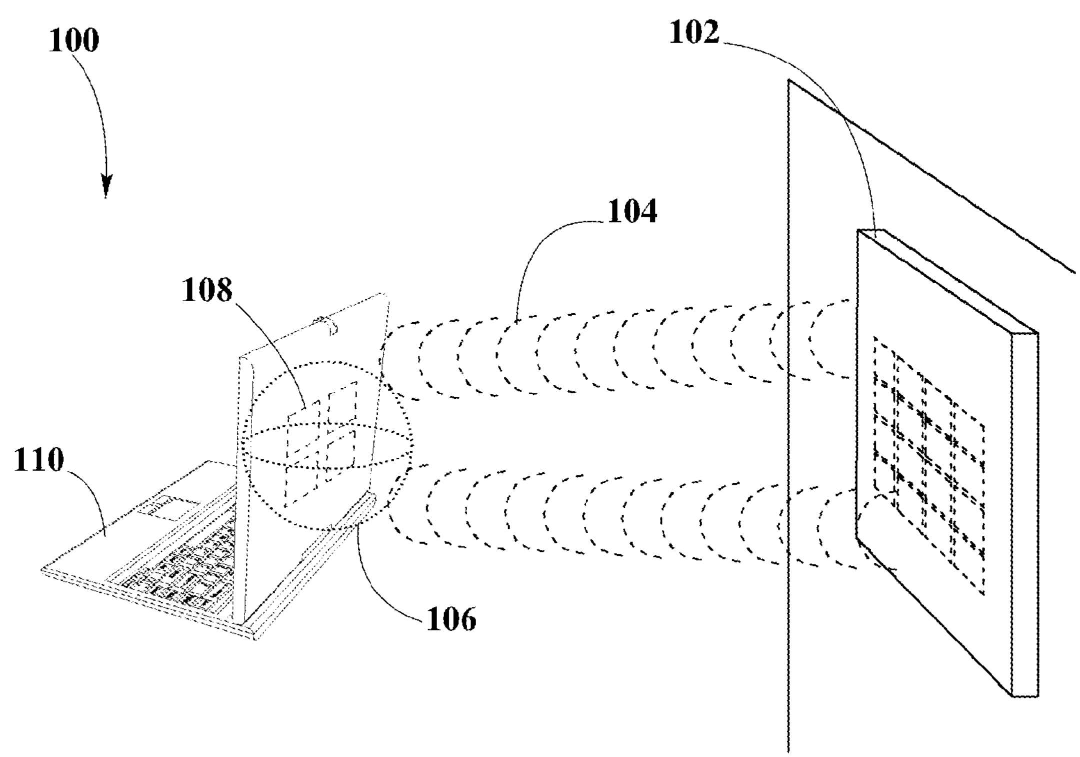
FIG. 1 illustrates a wireless power transmission example situation using pocket-forming.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket-forming to regulate power on one or more targeted receivers.

"Scheduling records" may refer to records stored in a database that contain information related to charging schedules and priorities of different receivers or devices.

"Power" sometimes is a colloquial reference to electrical energy, in the sense of "power transmission lines" which technically transmit energy, since "power" is the *rate* at which electric energy is transferred by an electric circuit. Thus, "wireless power transmission" within the context of this claim refers technically to mean "wireless energy transmission," and "wireless power system" also means "wireless energy system."

"BTLE" or "BLE": Bluetooth Low Energy communication hardware and/or software.

"Charge" in the context of this invention, refers to when a wireless power receiver converts RF energy, being received by its antenna, into electrical energy that is transmitted through an electrical circuit connection from said power receiver to an electrically connected client device using said electrical energy to charge the battery of the client device, if it has a battery, or to simply power the client device.

Description of the Drawings

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Wireless Power Transmission System Including Disclosed Concepts:

Methods disclosed here may be part of a wireless power transmission system including two or more wireless power transmitters, one or more wireless power receivers, one or more optional system management servers, and one or more optional mobile or hand-held computers, smart phones, or the like, that run the system management GUI app. This app may be made available at, downloaded, and installed from a public software app store or digital application distribution platform, such as Apple's iTunes, Google's Play Store, Amazon's Appstore, and the like.

The power transmitters and management servers may all communicate with each other through a distributed system database, and may also communicate present status and any status change to a remote information service that may be located in the Internet cloud.

One or more wireless power transmitters may automatically transmit power to any single wireless power receiver that is close enough for it to establish a communication connection with, using a suitable communication technology, including Bluetooth Low Energy or the like. Said receiver may then power or charge an electrically connected client device, such as mobile device, toy, remote control, lighting device, and the like. A single wireless power transmitter may also power multiple wireless power receivers simultaneously.

Alternately, the system can be configured by the system management GUI to automatically only transmit power to specific wireless power receivers depending on specific system criteria or conditions, such as the time or hour of the day for automatic time-based scheduled power transmission, power receiver physical location, owner of client device, or other any other suitable conditions and/or criteria.

The wireless power receiver is connected electrically to a client device, such a mobile phone, portable light, TV remote control, or any device that would otherwise require a battery or connection to wall power. In one or more embodiments, devices requiring batteries can have traditional batteries replaced by wireless power receiver batteries. The wireless power receiver then receives energy transmitted from the power transmitter, into receiver's antenna, rectifies, conditions, and sends the resulting electrical energy, through an electrical relay switch, to the electrically connected client device to power it or charge it.

A wireless power transmitter can transmit power to a wireless power receiver, which, in response, can power or charge its associated client device while device is in use or in motion anywhere within the power transmission range of the wireless power transmitter. The wireless power transmitter can power multiple devices at the same time.

The wireless power transmitter establishes a real-time communication connection with each receiver for the purpose of receiving feedback in real-time (such as 100 samples per second). This feedback from each receiver includes the measurement of energy presently being received, which is used by the transmitter to control the direction of the transmitter's antenna array so that it stays aimed at the receiver, even if the receiver moves to a different physical 3-D location or is in 3-D motion that changes its physical 3-D location.

Multiple wireless power transmitters can power a given, single receiver, in order to substantially increase power to it.

When a transmitter is done transmitting power to a receiver, it may communicate to the receiver that power transmission has ended, and disconnect communication. The wireless power transmitter may then examine its copy of the distributed system database to determine which, if any, receivers in power range it should next transmit power to.

FIG. 1 illustrates wireless power transmission 100 using pocket-forming. A transmitter 102 may transmit controlled Radio Frequency (RF) waves 104 which may converge in 3-d space. These RF waves may be controlled through phase and/or relative amplitude adjustments to form constructive and destructive interference patterns (pocket-forming). Pockets of energy 106 may form at constructive interference patterns and can be 3-Dimensional in shape whereas null-spaces may be generated at destructive interference patterns. A receiver 108 may then utilize pockets of energy produced by pocket-forming for charging or powering an electronic device, for example a laptop computer 110 and thus effectively providing wireless power transmission 100. In some embodiments, there can be multiple transmitters 102 and/or multiple receivers 108 for powering various electronic devices, for example smartphones, tablets, music players, toys and others at the same time. In other embodiments, adaptive pocket-forming may be used to regulate power on electronic devices.

Figure 2:
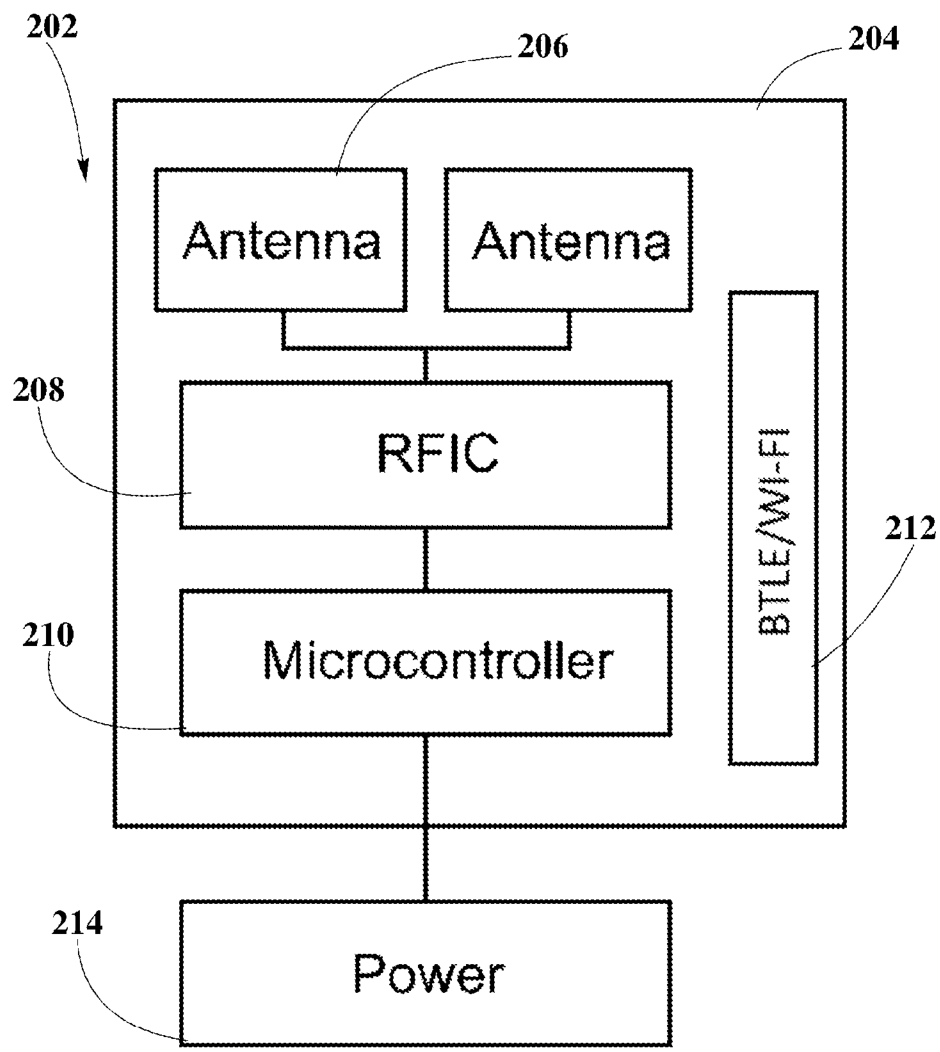
FIG. 2 illustrates a component level embodiment for a transmitter, according to an embodiment.

FIG. 2 illustrates a component level embodiment for a transmitter 202 which may be utilized to provide wireless power transmission 100 as described in FIG. 1. Transmitter 202 may include a housing 204 where at least two or more power transmitter antenna elements 206, at least one RF integrated circuit (RFIC 208), at least one digital signal processor (DSP) or micro-controller 210, and one optional communications component 212 may be included. Housing 204 can be made of any suitable material which may allow for signal or wave transmission and/or reception, for example plastic or hard rubber. Antenna elements 206 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 206 may include vertical or horizontal polarization, right hand or left hand polarization, elliptical polarization, or other suitable polarizations as well as suitable polarization combinations. Suitable antenna types may include, for example, patch antennas with heights from about ⅛ inches to about 6 inch and widths from about ⅛ inches to about 6 inch. Other antenna elements 206 types can be used, for example meta-materials, dipole antennas among others. RFIC 208 may include a proprietary chip for adjusting phases and/or relative magnitudes of RF signals which may serve as inputs for antenna elements 206 for controlling pocket-forming. These RF signals may be produced using an external power supply 214 and a local oscillator chip (not shown) using a suitable piezoelectric material. Micro-controller 210 may then process information sent by a receiver through its own antenna elements for determining optimum times and locations for pocket-forming. In some embodiments, the foregoing may be achieved through communications component 212. Communications component 212 may be based on standard wireless communication protocols which may include Bluetooth, Wi-Fi or ZigBee. In addition, communications component 212 may be used to transfer other information such as an identifier for the device or user, battery level, location or other such information. Other communications component 212 which may be used include radar, infrared cameras or sound devices for sonic triangulation for determining the device's position.

Multiple transmitter 202 units may be placed together in the same area to deliver more power to individual power receivers or to power more receivers at the same time, said power receivers being within power reception range of all the power transmitters 202.

Figure 3:
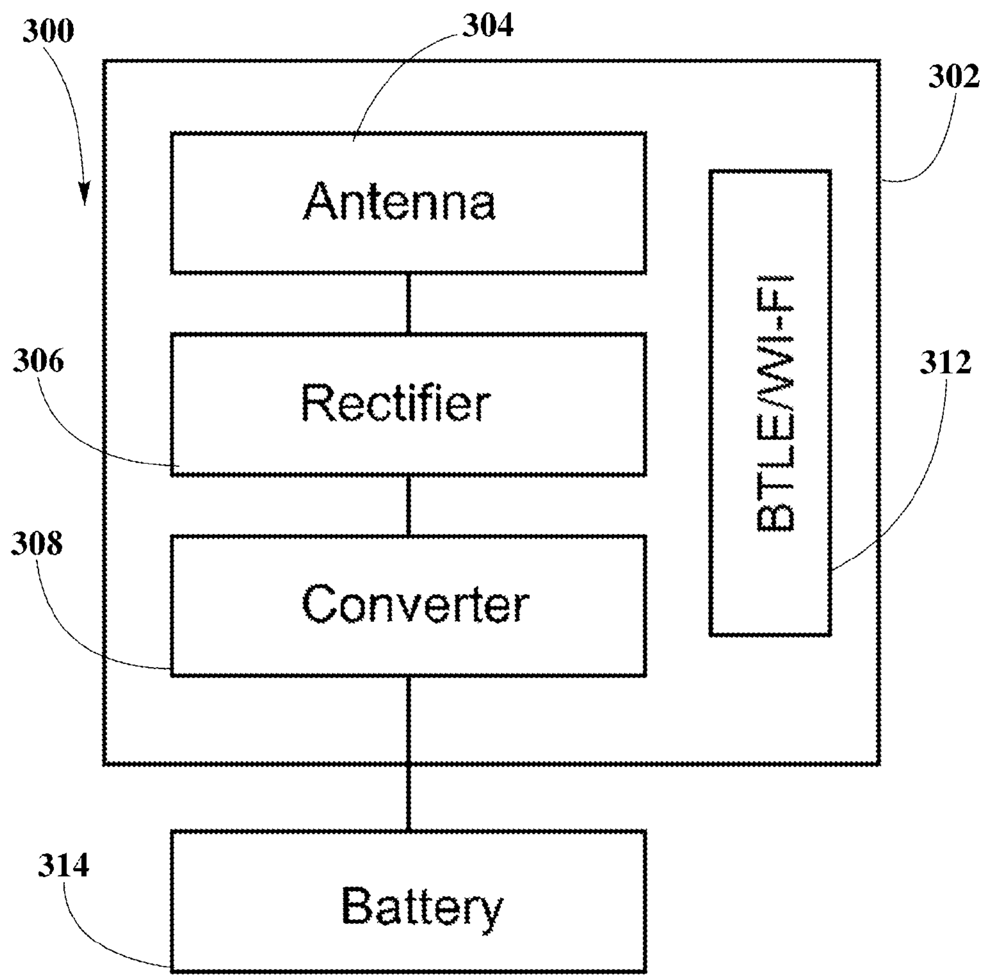
FIG. 3 illustrates a component level embodiment for a receiver, according to an embodiment.

FIG. 3 illustrates a component level embodiment for a receiver 300 which can be used for powering or charging an electronic device as exemplified in wireless power transmission 100. Receiver 300 may include a housing 302 where at least one antenna element 304, one rectifier 306, one power converter 308 and an optional communications component 312 may be included. Housing 302 can be made of any suitable material which may allow for signal or wave transmission and/or reception, for example plastic or hard rubber. Housing 302 may be an external hardware that may be added to different electronic equipment, for example in the form of cases, or can be embedded within electronic equipment as well. Antenna element 304 may include suitable antenna types for operating in frequency bands similar to the bands described for transmitter 202 from FIG. 2. Antenna element 304 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example a smartphone or portable gaming system. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inches to about 6 inch and widths from about ⅛ inches to about 6 inch. Patch antennas may have the advantage that polarization may depend on connectivity, i.e. depending on which side the patch is fed, the polarization may change. This may further prove advantageous as a receiver, such as receiver 300, may dynamically modify its antenna polarization to optimize wireless power transmission. Rectifier 306 may include diodes or resistors, inductors or capacitors to rectify the alternating current (AC) voltage generated by antenna element 304 to direct current (DC) voltage. Rectifier 306 may be placed as close as is technically possible to antenna element 304 to minimize losses. After rectifying AC voltage, DC voltage may be regulated using power converter 308. Power converter 308 can be a DC-DC converter which may help provide a constant voltage output, regardless of input, to an electronic device, or as in this embodiment to a battery 314. Typical voltage outputs can be from about 5 volts to about 10 volts. Lastly, communications component 312, similar to that of transmitter 202 from FIG. 2, may be included in receiver 300 to communicate with a transmitter 202 or to other electronic equipment.

Figure 4:
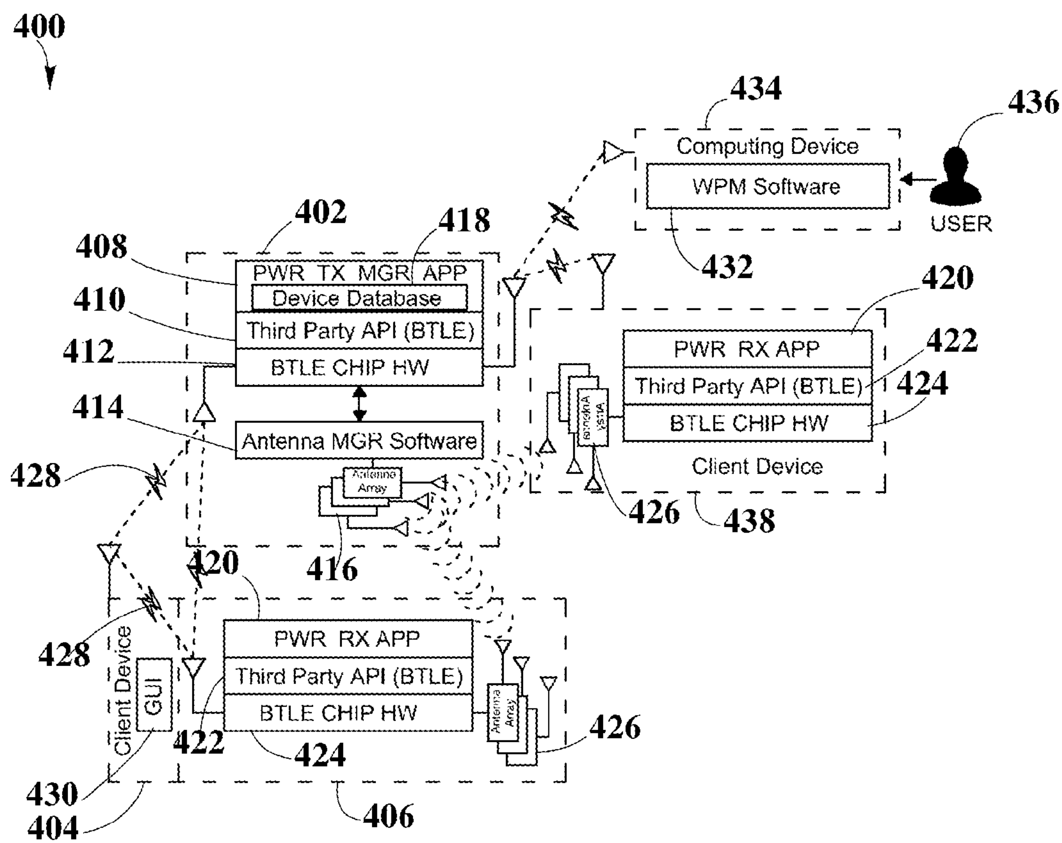
FIG. 4 illustrates an exemplary embodiment of a wireless power network including a transmitter an wireless receivers.

FIG. 4 shows an exemplary embodiment of a wireless power network 400 in which one or more embodiments of the present disclosure may operate. Wireless power network 400 may include communication between wireless power transmitter 402 and one or more wireless powered receivers. Wireless powered receivers may include a client device 404 with an adaptable paired receiver 406 that may enable wireless power transmission to the client device 404. In another embodiment, a client device 438 may include a wireless power receiver 406 built in as part of the hardware of the device. Client device 404 may be any device which uses an energy power source, such as, laptop computers, stationary computers, mobile phones, tablets, mobile gaming devices, televisions, radios and/or any set of appliances that may require or benefit from an electrical power source.

In one embodiment, wireless power transmitter 402 may include a microprocessor that integrates a power transmitter manager app 408 (PWR TX MGR APP) as embedded software, and a third party application programming interface 410 (Third Party API) for a Bluetooth Low Energy chip 412 (BTLE CHIP HW). Bluetooth Low Energy chip 412 may enable communication between wireless power transmitter 402 and wireless power receivers 406. Wireless power transmitter 402 may also include an antenna manager software 414 (Antenna MGR Software) to control an RF antenna array 416 that may be used to form controlled RF waves which may converge in 3-D space and create pockets of energy around wireless powered receivers. In some embodiments, Bluetooth Low Energy chip 412 may also be of other types of wireless communication protocols such as WiFi or the like.

Power transmitter manager app 408 may call third party application programming interface 410 for running a plurality of functions such as start a connection, end a connection, and send data among others. Third party application programming interface 410 may command Bluetooth Low Energy chip 412 according to the functions called by power transmitter manager app 408.

Power transmitter manager app 408 may also include a database 418, which may store relevant information from client devices 404, and receivers 406 such as, identification for a client device or power receiver, measured hardware values such as antenna voltage for a power receiver 406, status, configuration, location, signal strength and/or any relevant information from a client device 404 or receiver 406.

Third party application programming interface 410 at the same time may call power transmitter manager app 408 through a callback function which may be registered in the power transmitter manager app 408 at boot time. Third party application programming interface 410 may have a timer callback that may callback at the rate of ten times a second, and may send callbacks every time a connection begins, a connection ends, a connection is attempted, or a message is received.

Wireless power receiver 406 may include a power receiver app 420 (PWR RX APP), a third party application programming interface 422 (Third party API) for a Bluetooth Low Energy chip 424 (BTLE CHIP HW), and a RF antenna array 426 which may be used to receive and utilize the pockets of energy sent from wireless power transmitter 402.

Power receiver app 420 may call third party application programming interface 422 for running a plurality of functions such as start a connection, end the connection, and send data among others. Third party application programming interface 422 may have a timer callback that may callback at the rate of ten times a second and may send callbacks every time a connection begins, a connection ends, a connection is attempted, or message is received.

Client device 404 may be paired to an adaptable paired receiver 406 via a BTLE connection 428. A graphical user interface (GUI 430) may be used to manage the wireless power network from a client device 404. GUI 430 may be a software module that may be downloaded from any suitable application store and may run on any suitable operating system such as iOS and Android, among others. Client device 404 may also communicate with wireless power transmitter 402 via a BTLE connection 428 to send important data such as client device identification, as well as battery level information, geographic location data, manual charge commands, power schedule configuration, or other information that may be of use for the wireless power transmitter 402, and to receive information such as configuration, or data for the generation of reports to the user, among others. Client device 404 may also communicate with wireless power receiver 406 in via BTLE connection 428 to receive information such has hardware measurement values, voltage at receiver antennas, power receiver's unique identification, and the like. The GUI and wireless power receiver 406 integrated as part of the hardware within client device 438 may provide the same operation methods and functions as a separate adaptable paired receiver 406.

A wireless power manager 432 software may be used in order to manage wireless power network 400. Wireless power manager 432 may be a software module hosted in memory and executed by a processor inside a computing device 434. The wireless power manager 432 may include a GUI, app, host a GUI web page, or support a GUI app on a mobile or hand-held device, from where a user 436 may see options and statuses, as well as execute commands to manage the wireless power network 400. The computing device 434 may be connected to the wireless power transmitter 402 through standard communication protocols which may include Bluetooth, Wi-Fi or ZigBee. Power transmitter manager app 408 may exchange information with wireless power manager 432 in order to control access from client devices, and control power transmission to power receiver of said client devices 404. Functions controlled by the wireless power manager 432 may include, monitoring entire system, reporting all system activity and status, scheduling power transmission for individual devices, priorities between different client devices, access credentials for each client, physical location, broadcasting messages, and/or any functions required to manage the wireless power network 400.

Multiple wireless power transmitter 402 units may be placed together in the same area to deliver more power to individual power receivers or to power more receivers at the same time, said power receivers being within power reception range of all said power transmitters 402.

Figure 5:
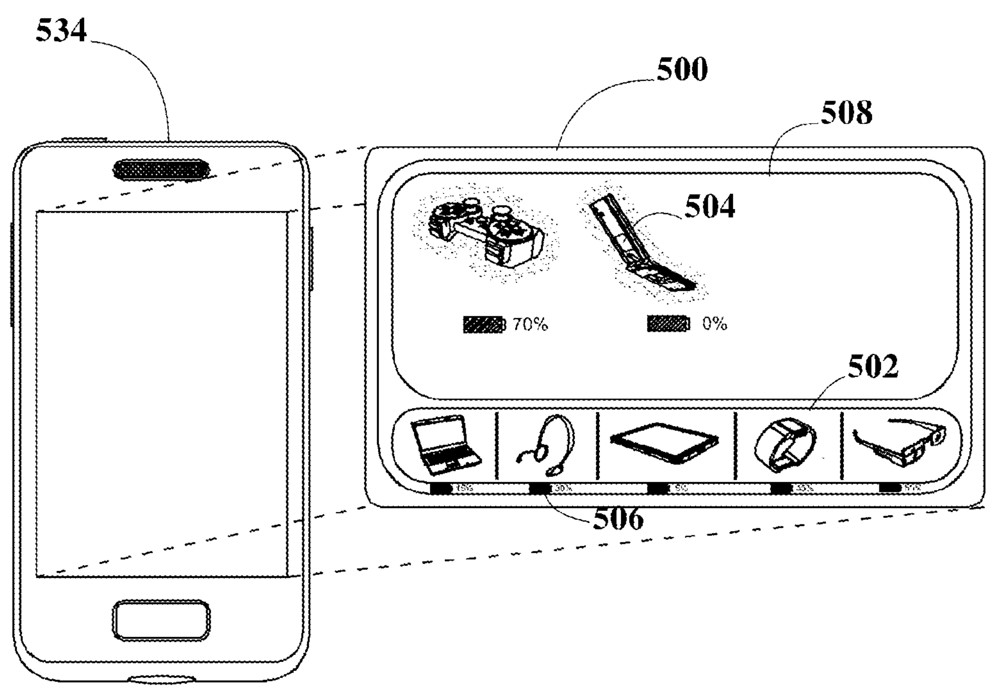
FIG. 5 is an exemplary embodiment of a Wireless Power Manager Graphic User Interface (GUI).

FIG. 5 is an exemplary embodiment of a wireless power charging UI 500. Wireless power charging UI 500 may be a software module hosted in memory and executed by a processor in a computing device 534. Wireless power charging UI 500 may be included as part of a wireless power manager application in order to select and deselect one or more wireless power devices to charge or power in a wireless power network.

Wireless power charging UI 500 may include a charge off area 502 which may display device icons that represent the different client devices 504 that are not to have power transmitted to them in a wireless power network. If the device, represented by a given icon, contains a battery then its icon, or a sub-icon near the device icon may also additionally include a charge level 506 icon which may serve as an indication of battery present charge or state and/or how much energy charge the client devices 504 battery, if any, possess at the moment.

Wireless power charging UI 500 may also include a charging area 508 which may display icons that represent the different client devices 504 that are receiving power from a wireless power transmitter in a wireless power network. Each icon may also include a charge level 506 icon which may serve as an indication of battery present charge state and/or how much energy charge the client device's 504 battery, if any, possess at the moment. A client device 504 in the charging area 508 may also include additional indicators to show a device is charging. For example and without limitation, a client device 504 icon may be surrounded by a flashing or pulsating halo when the device is receiving power; in another example the charge level 506 icon may be flashing; In yet another example; the client device 504 may include transparent overlapped text such as a message reading "Charging".

User may drag and drop a client device 504 from the charge off area 502 into the charging area 508 in order to begin charging a device. A user may also select a client device 504 from the charging area 508 and drag and drop it into the charge off area 502 in order to stop charging the device. The user may perform this actions using known in the art UI navigation tools such as, a mouse click or touch screen for example.

Figure 6:
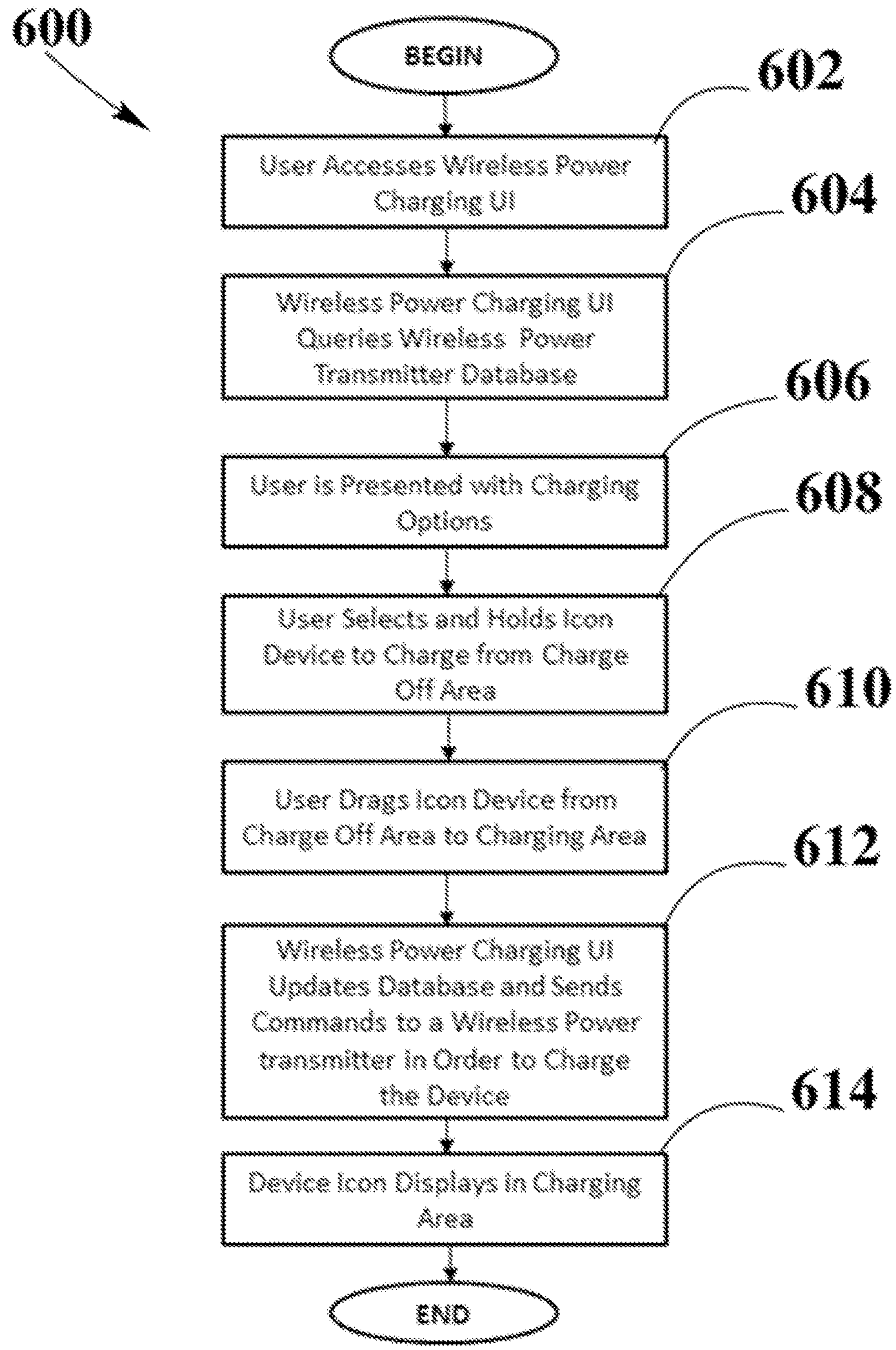
FIG. 6 is a flowchart of a process to manually enable power charging of a device in a wireless power network.

FIG. 6 is a flowchart describing a process 600 by which a user may charge a device in a wireless power network. The process may begin when a user accesses, logs on to, or begins to use the wireless power charging UI (block 602). The wireless power charging UI may be a software module hosted in memory and executed by a processor in a suitable computing device, such as, a laptop computer, smartphone and the like. The wireless power charging UI may be a software module implemented as part of the wireless power manager application (described in FIG. 4) used to manage a wireless power network. The wireless power charging software may then query (block 604) a database stored in a wireless power transmitter in order to extract records of all wireless power receivers in the wireless power network. The wireless power charging UI may also create a local copy of the database in the memory of the computing device hosting the wireless power charging UI. A copy of the database may be re-created and mirrored into each computing device in the wireless power network in order to create a distributed database environment and enable sharing all the information across all computing devices in the wireless power network. Extracted information may include for example records indicating status of each wireless power receiver in the wireless power network, their associated client devices, battery level and charge status, owner, and/or any associated information from the components in a wireless power network. The extracted information may then be presented (block 606) and shown to the user in a wireless power charging UI such as the one described in FIG. 5. From the wireless power charging UI the user may select and hold the icon for the device he may desire to charge from the charge off screen area of the wireless power charging UI (block 608). At this point the icon for the device may change or become highlighted in order to indicate that the device has been selected, for example the image of the icon may become larger when a user selects the device from the charge off area. The user may then drag the icon device from the charge off area to the charging area (block 610). The wireless power charging UI may then update the database and send commands to the wireless power transmitter (block 612) in order to begin charging the device. The database in the wireless power transmitter may then be updated with any necessary information. The charging area of the wireless power charging UI may then display an icon indicating that the selected device is charging (block 614). The icon from the corresponding device may then be removed from the charge off area of the wireless power charging UI.

Figure 7:
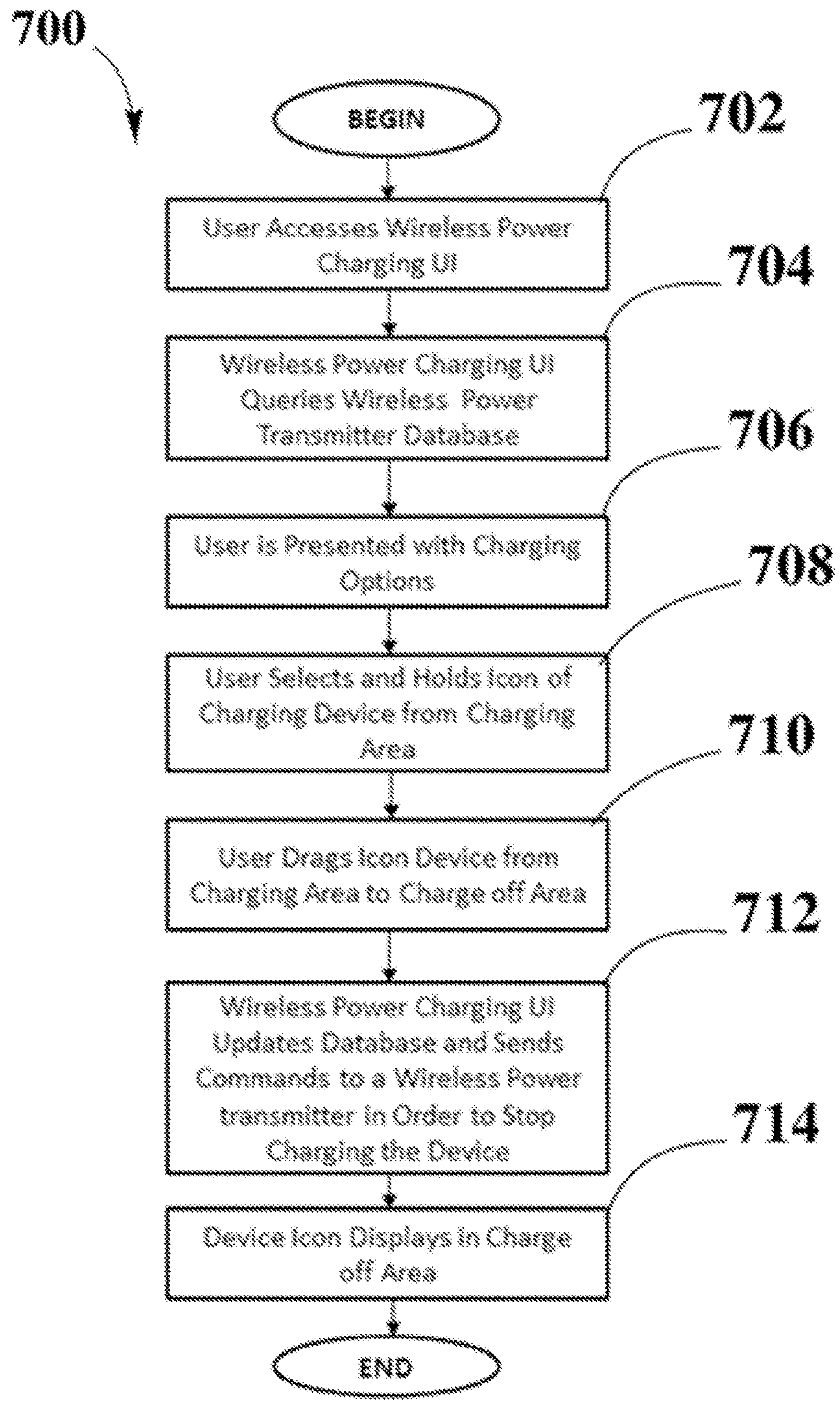
FIG. 7 is a flowchart of a process for disabling a device from charging in a wireless power network.

FIG. 7 is a flowchart describing a process 700 by which a user may disable a device from charging in a wireless power network. The process may begin when a user accesses the wireless power charging UI (block 702). The wireless power charging UI may be a software module hosted in memory and executed by a processor in a suitable computing device, such as, a laptop computer, smartphone and the like. The wireless power charging UI may be a software module implemented as part of the wireless power manager application (described in FIG. 4) used to manage a wireless power network. The wireless power charging software may then query (block 704) a database stored in a wireless power transmitter in order to extract records of all wireless power receivers in the wireless power network. Extracted information may include for example records indicating status of each wireless power receiver in the wireless power network, their associated devices, battery level and charge status, owner, and/or any associated information from the components in a wireless power network. The extracted information may then be presented (block 706) and shown to the user in a wireless power charging UI such as the one described in FIG. 5. From the wireless power charging UI the user may select and hold the icon for the device he may desire to charge off, from within the charging area of the wireless power charging UI (block 708). At this point the icon for the device may change or be highlighted in order to indicate that the device has been selected, for example the image of the icon may become larger when a user selects the device from the charging area. The user may then drag and drop the icon device from the charging area to the charge off area(block 710). The wireless power charging UI may then update the database and send commands to the wireless power transmitter (block 712) to disable charging the device. The database in the wireless power transmitter may then be updated with any necessary information. The charge off area of the wireless power charging UI may then display an icon of the device indicating that the selected device is no longer being charged (block 714). The icon of the corresponding device may then be removed from the charging area of the wireless power charging UI.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of selectively charging one or more electronic devices in a wireless power network, the method comprising:

providing a wireless power network comprising a controlling electronic device that includes a display, at least one wireless power transmitter, and a plurality of electronic devices each having an associated wireless power receiver, wherein the controlling electronic device is distinct and separate from the at least one wireless power transmitter;

at the controlling electronic device:

receiving data comprising a charge status for each of the plurality of electronic devices;

displaying, on the display, representations of one or more electronic devices of the plurality of electronic devices;

detecting a user selection of one of the representations corresponding to a device selected to be charged; and upon detecting the user selection, sending a command to the at least one wireless power transmitter to transmit radio frequency (RF) waves that constructively interfere with one another in proximity to a location of a wireless power receiver associated with the device selected to be charged.

2. The method of claim 1, wherein:

displaying the representations of the one or more electronic devices comprises displaying the representations of the one or more electronic devices in a first region of the display; and the method further comprises, at the controlling electronic device:

displaying, in a second region of the display that is adjacent to the first region of the display, representations of one or more additional electronic devices of the plurality of electronic devices.

3. The method of claim 2, wherein:

each of the one or more additional electronic devices represented in the second region of the display is currently receiving RF waves from one or more wireless power transmitters included in the wireless power network; and each of the one or more electronic devices represented in the first region of the display is currently not receiving RF waves.

4. The method of claim 3, wherein detecting the user selection comprises:

ceasing to display the user selected representation corresponding to the device selected to be charged in the first region of the display; and displaying the user selected representation in the second region of the display.

5. The method of claim 4, wherein ceasing to display the user selected representation in the first region of the display and displaying the user selected representation in the second region of the display comprises animating movement of the user selected representation from the first region of the display to the second region of the display in accordance with a detected movement of the user selected representation.

6. The method of claim 4, further comprising, at the controlling electronic device:

detecting, in the second region of the display, an additional user selection of the user selected representation corresponding to the device selected to be charged; and in response to detecting the additional user selection, sending another command to the at least one wireless power transmitter to cease transmitting the RF waves.

7. The method of claim 6, wherein detecting the additional user selection comprises:

ceasing to display the user selected representation corresponding to the device selected to be charged in the second region of the display; and displaying the user selected representation in the first region of the display.

8. The method of claim 1, wherein:

the wireless power network further includes a plurality of wireless power transmitters, including the at least one wireless power transmitter;

the plurality of wireless power transmitters is assigned to a designated area; and the wireless power receiver associated with the device selected to be charged is located within the designated area.

9. The method of claim 8, wherein the wireless power receiver associated with the device selected to be charged is within a predefined transmission range of the at least one wireless power transmitter.

10. The method of claim 8, wherein receiving the data comprises receiving the data from one or more of the plurality of wireless power transmitters.

11. The method of claim 1, wherein each of the representations includes the charge status associated with the one or more electronic devices.

12. The method of claim 1, further comprising, at the controlling electronic device:

after sending the command to the at least one wireless power transmitter, adding an indicator to the user selected representation corresponding to the device selected to be charged to indicate reception of the RF waves by the wireless power receiver associated with the device selected to be charged.

13. A wireless power system, comprising:

one or more wireless power transmitters;

a plurality of electronic devices each having an associated wireless power receiver; and a controlling electronic device, which is distinct and separate from the one or more wireless power transmitters, having a display and configured to:

receive data comprising a charge status for each of the plurality of electronic devices;

display, on the display, representations of one or more electronic devices of the plurality of electronic devices;

detect a user selection of one of the representations corresponding to a device selected to be charged; and upon detecting the user selection, send a command to at least one wireless power transmitter of the one or more wireless power transmitters, wherein the least one wireless power transmitter is configured to, upon receiving the command from the controlling electronic device, transmit radio frequency (RF) waves that constructively interfere with one another in proximity to a location of a wireless power receiver associated with the device selected to be charged.

14. The wireless power system of claim 13, wherein:

the representations of the one or more electronic devices are displayed in a first region of the display; and the controlling electronic device is further configured to:

display, in a second region of the display that is adjacent to the first region of the display, representations of one or more additional electronic devices of the plurality of electronic devices.

15. The wireless power system of claim 14, wherein:

each of the one or more additional electronic devices represented in the second region of the display is currently receiving RF waves from at least some of the one or more wireless power transmitters; and each of the one or more electronic devices represented in the first region of the display is currently not receiving RF waves.

16. The wireless power system of claim 14, wherein detecting the user selection comprises:

ceasing to display the user selected representation corresponding to the device selected to be charged in the first region of the display; and displaying the user selected representation in the second region of the display.

17. The wireless power system of claim 16, wherein ceasing to display the user selected representation in the first region of the display and displaying the user selected representation in the second region of the display comprises animating movement of the user selected representation from the first region of the display to the second region of the display in accordance with a detected movement of the user selected representation.

18. The wireless power system of claim 16, wherein:

the controlling electronic device is further configured to:

detect, in the second region of the display, an additional user selection of the user selected representation corresponding to the device selected to be charged; and upon detecting the additional user selection, send another command to the at least one wireless power transmitter to cease transmitting the RF waves; and the least one wireless power transmitter is configured to, upon receiving the other command from the controlling electronic device, cease transmission of the RF waves.

19. The wireless power system of claim 18, wherein detecting the additional user selection comprises:

ceasing to display the user selected representation corresponding to the device selected to be charged in the second region of the display; and displaying the user selected representation in the first region of the display.

20. The wireless power system of claim 13, wherein:

the one or more wireless power transmitters are assigned to a designated area; and the wireless power receiver associated with the device selected to be charged is located within the designated area.

* * * * *